US006685842B2

(12) United States Patent
Jang et al.

(10) Patent No.: US 6,685,842 B2
(45) Date of Patent: Feb. 3, 2004

(54) THERMOPHORETIC PARTICLE REMOVING SYSTEM

(75) Inventors: Ruei-Hung Jang, Shinjuang (TW); Chih-Lin Ying, Hsin chu (TW); Tien-Hsing Woo, Taipei (TW); Shan-Hua Wu, Hsinchu (TW); Ming-Kuo Yu, Hsinchu (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 210 days.

(21) Appl. No.: 10/039,477

(22) Filed: Dec. 31, 2001

(65) Prior Publication Data

US 2003/0121869 A1 Jul. 3, 2003

(51) Int. Cl.[7] .......................... B01D 17/09; B01D 59/16
(52) U.S. Cl. ....................................... 210/775; 210/176
(58) Field of Search ................................ 210/774, 775, 210/742, 176

(56) References Cited

U.S. PATENT DOCUMENTS 5,158,690 A * 10/1992 Batchelder et al. ......... 210/775

* cited by examiner

*Primary Examiner*—Robert J. Popovics
(74) *Attorney, Agent, or Firm*—Tung & Associates

(57) ABSTRACT

A method and apparatus for carrying out a method for thermophoretically removing particles from a particulate containing liquid the method including providing a heated turbulent flowing particulate contain liquid through a first conduit; redirecting a portion of the particulate containing liquid through a second conduit to provide laminar flow having a flow direction substantially parallel to the first conduit; forming a thermal gradient in said second conduit substantially perpendicular to the flow direction; concentrating particles in the particulate containing liquid in a portion of the second conduit aided at least in part by thermophoretic forces; and, separating the particulate containing liquid into at least a relatively concentrated particle containing portion and a relatively unconcentrated particle containing portion.

10 Claims, 2 Drawing Sheets

10
12
12C
13
12B
14
18A
22A
18B
22B
16C
16B
36
20
34
16
22C
18C
28A
30
32
34A

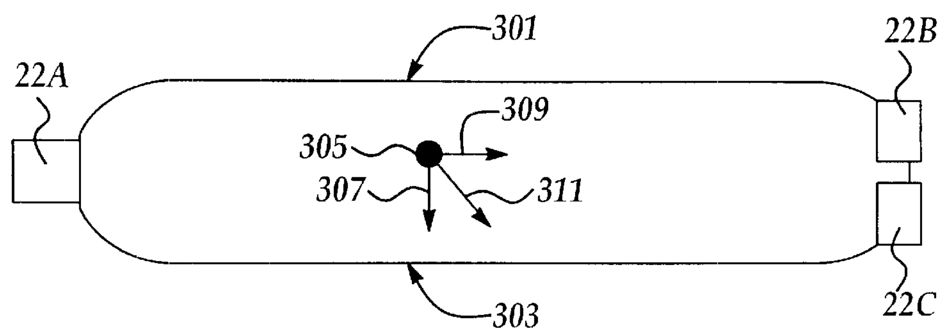
Figure 3A
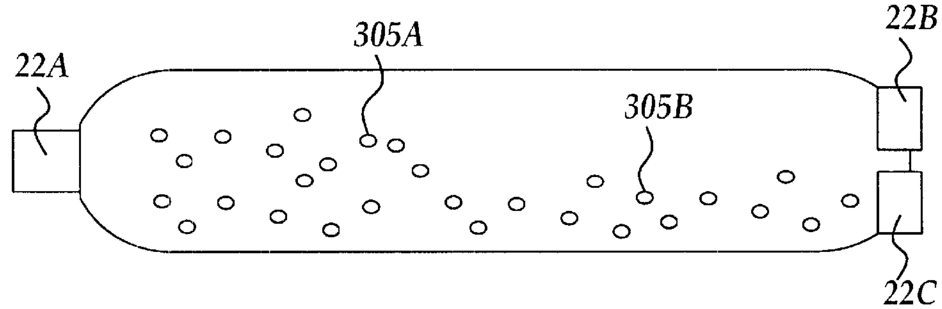
Figure 3B
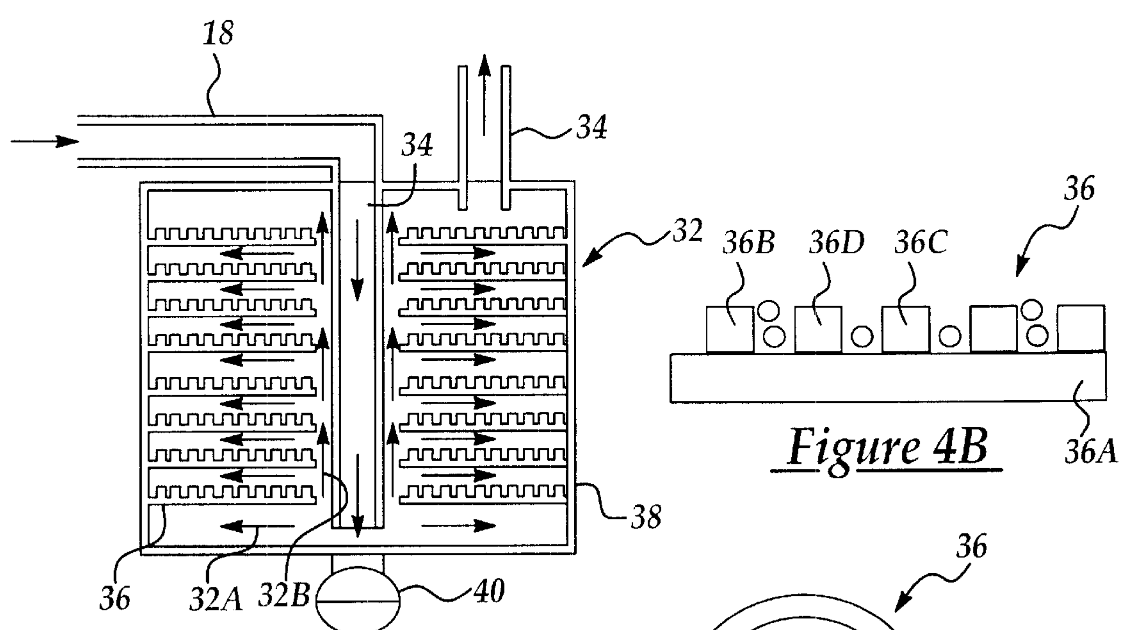
Figure 4A
Figure 4B
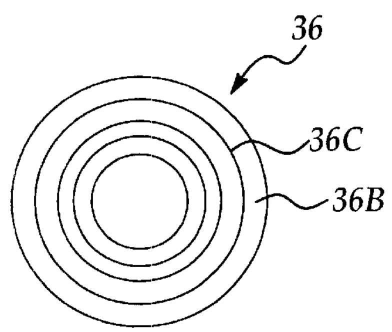
Figure 4C

THERMOPHORETIC PARTICLE REMOVING SYSTEM

FIELD OF THE INVENTION

This invention generally relates to removal of particles from a liquid system and more particularly to a thermophoretic method and system for removing particles included in a particulate containing liquid.

BACKGROUND OF THE INVENTION

The removal of small particles from chemical process fluids is a general problem to which a wide variety of techniques have been applied. Liquids are much more difficult to filter than gases for several physical reasons. For example, Brownian motion causes aerosol particles to travel much farther in gases than in liquids, providing an increased opportunity for the particles to collide with and stick to a membrane. In addition, viscous drag is much smaller in gases (for the same volume of material) so that smaller pore sized filters can be used in gases without unduly limiting pressure drops. Furthermore, the adhesion of particles to, for example, a membrane is less likely than in gases due to larger viscous drag forces present in liquids thereby making it more likely that particles are more likely to be re-entrained in the liquid.

Most filters for liquids rely on sieving, using pores having dimensions smaller than the particles to be captures; this leads to more clogging problems than occur with filters for gases. Moreover, the strong forces exerted by liquid flow impingement on the filters can destroy the filters. In addition, poor initial wetting of filter membranes can reduce the sieving performance of liquid filters. Other shortcomings of membrane filters include the limited ability to recycle the membranes for use in different processes. In view of the several shortcomings of sieving (filtering) to remove particles from liquid processes, other techniques have been developed which have provided partial solutions.

For example, electrophoretic techniques have been developed using dipole fields in molecular separations. Multipole fields are useful for filtering liquids having sufficiently low electrical conductivity. Uniform electric fields can be used to remove charged particles from high-resistivity (low conductivity) liquids. A general difficulty with using electric fields is that the magnitude and sign of the charge on a particle, if any, depends upon the pH of the solution, the type of particle and the type of solution. Further, any particles without an electrical charge will not be removed. These limitations restrict the applicability of filtering using electrophoresis techniques.

Another example includes magnetophoretic techniques which apply inhomogeneous magnetic fields to exert variable forces on particles suspended in solution depending on a particle's magnetic susceptibility. Although magnetophoresis is a useful tool in separation of materials in the field of waste re-cycling, it appears inefficient for applications requiring ultra-small particle separation.

Yet another technique that has been developed to remove particles from a liquid solution is a flotation mechanism or settling rate. Generally, depending on the particle size and particle charging characteristics determining particle adhesion characteristics, the particles including adhering groups of particles display certain settling behaviors. Generally, larger groups of particles settle faster than smaller groups. This method, however, is generally inefficient in terms of processing time and is limited to larger particles that settle within a reasonable time.

One area where there has been limited application of the method to the problem of liquid filtering includes thermophoresis. Thermophoresis works by the presence of differential pressures exerted on particles due to the presence of a thermal gradient, causing the particles to migrate from an area of higher temperature to an area of lower temperature. The phenomenon of thermophoresis is well known and has been observed in gases, for example, aerosols, and liquids some time. For example, one application of thermophoresis relates to particles dispersed in a fluid trapped between two plates of differing temperatures will migrate towards and eventually deposit on the colder plate. This application, however, is not practical for use as a particle liquid since deposition on the surface of a flow cell or flow cavity is transitory, turbulence or pressure fluctuations being sufficient in many cases to agitate the particles back into the liquid flow stream.

Therefore, there is a need to develop a thermophoretic system and method whereby a wide range of particle sizes present in a liquid may be effectively captured and removed from the liquid without creating an unacceptable pressure drop while providing for cost effective recycling of the particle filtering means.

It is therefore an object of the invention to provide thermophoretic system and method whereby a wide range of particle sizes present in a liquid may be effectively captured and removed from the liquid without creating an unacceptable pressure drop while providing for cost effective recycling of the particle filtering means, while overcoming other shortcomings and deficiencies in the prior art.

SUMMARY OF THE INVENTION

To achieve the foregoing and other objects, and in accordance with the purposes of the present invention, as embodied and broadly described herein, the present invention provides a method and apparatus for thermophoretically removing particles from a particulate containing liquid.

In a first embodiment according to the present invention, a method is provided for thermophoretically removing particles from a particulate containing liquid including providing a heated turbulent flowing particulate contain liquid through a first conduit; redirecting a portion of the particulate containing liquid through a second conduit to provide laminar flow having a flow direction substantially parallel to the first conduit; forming a thermal gradient in said second conduit substantially perpendicular to the flow direction; concentrating particles in the particulate containing liquid in a portion of the second conduit aided at least in part by thermophoretic forces; and, separating the particulate containing liquid into at least a relatively concentrated particle containing portion and a relatively unconcentrated particle containing portion.

In a related embodiment the thermal gradient is formed by thermally conductively contacting said upper portion of the second conduit with the lower portion of said first conduit the thermal gradient having a decreasing temperature profile in a direction toward the lower portion of the second conduit.

In another related embodiment, the step of separating the particulate containing liquid further comprises collecting the relatively concentrated particle containing portion in a lower portion of the second conduit such that the relatively unconcentrated particle containing portion is collected in an upper portion of the second conduit exiting through an upper exit portion of the second conduit to be returned to the first conduit the lower portion exiting through a lower exit portion of the second conduit.

In another embodiment, thermal conductance in a direction other than substantially perpendicular to the flow direction is minimized.

In yet another embodiment, the method further includes maintaining the temperature gradient by providing a heat sink at a relatively lower temperature than the first conduit and the second conduit said heat sink in thermally conductive communication with the second conduit.

In another embodiment, the method further includes the step of removing particles from the particulate containing liquid included in the lower portion exiting through the lower exit portion of the second conduit.

In a related embodiment, the step of removing particles includes passing the particulate containing liquid over at least one depositing surface to form a flow pathway such that particles included in the particulate containing liquid are captured and entrapped upon impacting said at least one depositing surface.

In another related embodiment, the at least one depositing surface is in thermally conductive communication with a heat sink maintained at a temperature relatively lower than the at least one depositing surface temperature.

In yet another related embodiment, the at least one depositing surface includes a plurality of protrusions extending into the flow pathway to form a plurality of particle capturing spaces.

In a separate embodiment, the steps are performed in parallel according to a plurality of serially connected first and second conduits.

In a separate embodiment according to the present invention, a thermophoretic system is provided for removing particles from a particulate containing liquid including a first conduit with means for generating a turbulent flow therein said first conduit having a second conduit formed substantially parallel to a flow direction thereto; said second conduit being in bypass flowable communication with the first conduit such that a portion of the turbulent flow is redirected to the second conduit to form a laminar flow in the second conduit; the second conduit being in thermal contact with the first conduit for forming a thermal gradient substantially perpendicular to the flow direction to exert a thermophoretic force on particles included in the laminar flow.

In a related embodiment, an upper portion of the second conduit forms thermally conductive contact with the lower portion of said first conduit thereby forming the thermal gradient said thermal gradient having a decreasing temperature profile in a direction toward the lower portion of the second conduit.

In another embodiment, the second conduit further includes an inlet flowable pathway and at least an upper outlet flowable pathway and a lower outlet flowable pathway said upper outlet flowable pathway in flowable communication with the first conduit to return a portion of the laminar flow to the first conduit. Further, the thermophoretic system further includes a means for selectively regulating a flow through the second conduit to maintain laminar flow conditions.

In another embodiment, thermal conductance in a direction other than substantially perpendicular to the flow direction is minimized by providing thermally insulating plumbing connections.

In another embodiment, the thermophoretic system further includes a heat sink in thermally conductive communication with the second conduit for maintaining the thermal gradient.

In a separate embodiment, the thermophoretic system further includes a particle removing means in flowable communication with the lower outlet flowable pathway. Further, the particle removing means includes a plurality of depositing surfaces disposed along a flow pathway such that particles included in a particulate containing liquid are captured and entrapped upon impacting said depositing surfaces. Further, the plurality of depositing surfaces are in thermally conductive communication with a heat sink maintained at a temperature relatively lower than the depositing surfaces. Further yet, the plurality of depositing surfaces include a plurality of protrusions extending from the depositing surfaces into the flow pathway to form a plurality of particle capturing spaces.

In a separate embodiment, a plurality of thermophoretic systems are disposed in serial flowable communication to increase a particle removing efficiency.

These and other embodiments, aspects and features of the invention will be better understood from a detailed description of the preferred embodiments of the invention which are further described below in conjunction with the accompanying Figures.

BRIEF DESCRIPTION OF THE DRAWINGS

FIGS. 3A and 3B are conceptual schematic representations of the operation of the thermophoretic tunnel according to the present invention.

FIGS. 4A through 4C are schematic representations of the particle collector and portions thereof included in the one embodiment of the thermophoretic system according to the present invention.

DETAILED DESCRIPTION OF THE PREFERRED EMBODIMENTS

Figure 1:
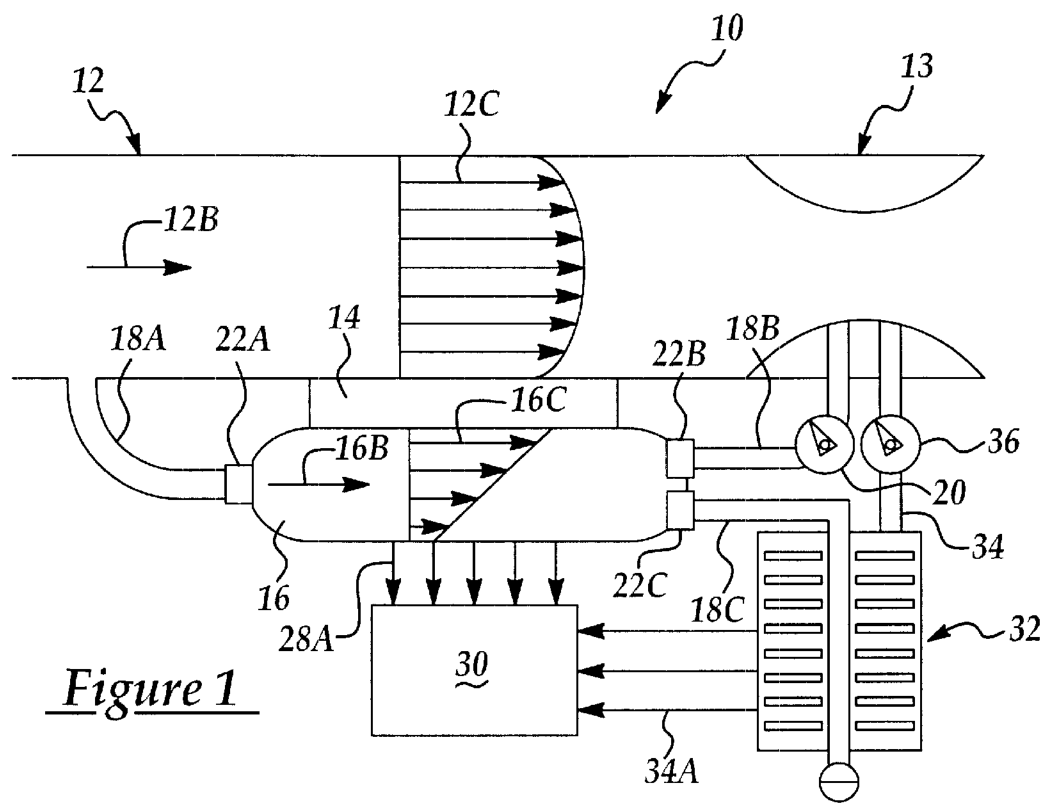
FIG. 1 is a schematic side view representation of one embodiment of the thermophoretic system according to the present invention.

Referring to FIG. 1 is shown a schematic side view representation of one embodiment of a thermophoretic particle removal system 10 for carrying out the method according to the present invention. A main liquid conduit 12, for example a pipe for conveying a particulate containing liquid is preferably oriented with a flow direction 12B substantially perpendicular to a gravitational force. It will be appreciated that other orientations may be used as well. In one aspect of the embodiment, particulate containing liquid flowing through main liquid conduit 12 acts as a heat source, being of a relatively higher temperature compared to the thermophoretic particle removal system so as to create a thermal gradient. In one exemplary operation, for example the particulate containing liquid temperature may be from about 100° C. to about 130° C. In thermal contact with the lower part of the main liquid conduit 12, is thermal bridge 14. The main liquid conduit 12 and the thermal bridge 14 are preferably made of material with good thermally conductivity such as metal, but with low chemical reactivity and a resistance to corrosion, for example stainless steel, anodized aluminum and alumina. A thermophoretic tunnel 16 is in thermal contact with the lower part of thermal bridge 14 arranged for optimized (high surface area) heat exchange. For example, the thermal bridge 14 is preferably a rectangular member with a length from about 50 percent to about 100 percent of the length of the thermophoretic tunnel and a thickness of about ¼ to about ½ of the diameter of the thermophoretic tunnel 16. The thermal bridge 14 forms a thermal contact bridge for thermal conductance spanning a distance between the thermophoretic tunnel 16 and the main liquid conduit 12.

The thermophoretic tunnel 16 is preferably disposed below the main liquid conduit 12 and in thermally conductive contact with main liquid conduit 12 through thermal bridge 14 such that a thermal gradient originating from the main liquid conduit 12 heated by the particulate containing liquid acting is directed substantially perpendicular to a fluid flow direction e.g., 16B through thermophoretic tunnel 16. Preferably, the thermal gradient through the thermophoretic tunnel is directed substantially parallel to a gravity force direction.

The arrows, e.g., 12C and 16C in main liquid conduit 12 and thermophoretic tunnel 16, respectively, together schematically represent a temperature profile according to an exemplary operation of the thermophoretic system of the present invention. For example, the temperature profile in the main liquid conduit 12, indicated by arrows e.g., 12C, the size of an arrow being representative of a relative temperature magnitude, gives a convex profile due in part to a turbulent flow in main liquid conduit 12. Any known means for creating turbulent flow in main liquid conduit 12 may be used, for example, a converging diverging diffuser 13 disposed at an exit end of main liquid conduit 12 may be a suitable means to create an upstream turbulent flow in main liquid conduit 12. The temperature profile in the thermophoretic tunnel 16, indicated by arrows e.g., 16C, indicates a temperature magnitude decreasing in a direction toward a lower portion of thermophoretic tunnel 16 and substantially perpendicular to a flow direction 16B.

In one embodiment, thermophoretic tunnel 16 is in flowable communication with main liquid conduit 12, for example an inlet pipe 18A and an outlet pipe 18B, each having a radius of curvature to maintain laminar flow through thermophoretic tunnel 16. In exemplary operation about 5% of the fluid flowing in main liquid conduit 12 is redirected into inlet pipe 18A. Preferably, a flow regulator 20, including for example a flow sensor and a pressure regulator, is disposed in the flow path of outlet pipe 18B between thermophoretic tunnel 16 and main liquid conduit 12 in order to selectively control a flow rate through thermophoretic tunnel 16 to ensure laminar flow through thermophoretic tunnel 16. Preferably, the temperature gradient and the flow rate through thermophoretic tunnel 16 is sufficient to allow a thermophoretic force to separate particles contained in the particulate containing liquid to a lower part of the thermophoretic tunnel 16 prior to a flow exiting from thermophoretic tunnel 16 through, for example, outlet pipe 18B. It will be appreciated that the efficiency of particle separation in thermophoretic tunnel 16 depends on a number of factors including the magnitude of the thermal gradient through thermophoretic tunnel 16 and the flow rate of the particulate containing liquid through thermophoretic tunnel 16.

Preferably, adiabatic connectors surround inlets 22A and outlets 22B, and 22C, the connectors preferably made of a pliable, heat resistant, thermally insulating material, for example PTFE. The adiabatic connectors surrounding inlets 22A and outlets 22B, and 22C, connect inlet pipe 18A and outlet pipes 18B and 18C respectively to thermophoretic tunnel 16 to prevent lateral thermal conduction along those pathways thereby maintaining the magnitude of the temperature gradient substantially perpendicular to a flow direction 16B in the thermophoretic tunnel 16.

Figure 2A:
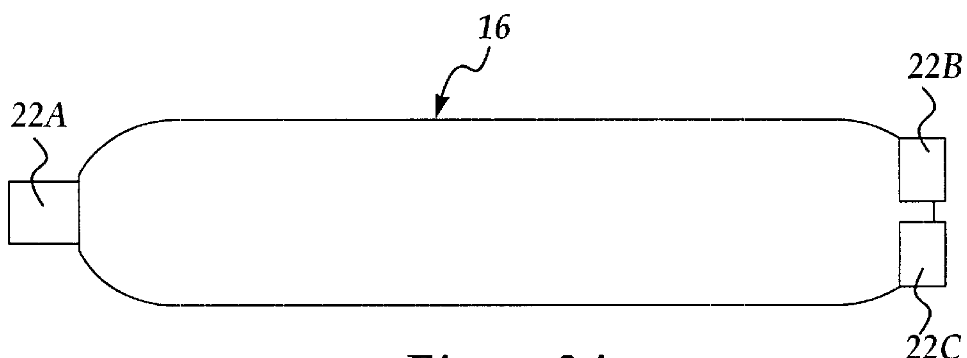
FIGS. 2A and 2B are a side view and a cross sectional view, respectively, of a thermophoretic tunnel included in the thermophoretic system according to the present invention.
Figure 2B:
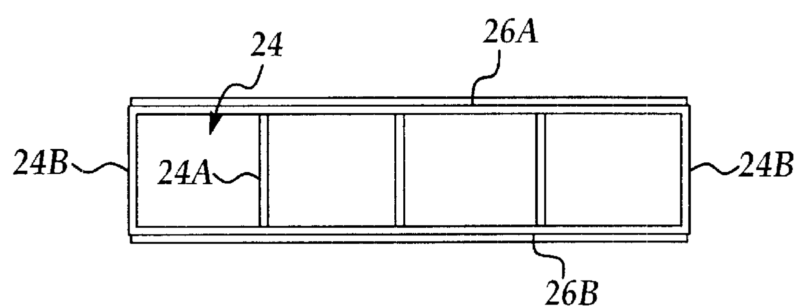

In another embodiment, the thermophoretic system of the present invention includes flow channels passing through thermophoretic tunnel 16. For example, FIG. 2A shows a side view of the thermophoretic tunnel 16 with inlet 22A and outlets 22B and 22C. FIG. 2B shows a portion of a cross section of thermophoretic tunnel 16 taken along cross sectional cut a—a as shown in FIG. 2A. The flow channels e.g., 24 are preferably rectangular with thermally insulating (adiabatic) walls e.g., 24A including walls 24B making up the outer wall portion of peripheral flow channels. Heat conducting plates 26A and 26B, preferably having good thermal conductivity and chemically inertness, for example stainless steel, are disposed such that they form the top (26A) and bottom (26B) portions of the flow channels, e.g., 24 to provide a thermally conductive pathway including a thermal gradient and a pressure gradient from an upper to a lower portion of thermophoretic tunnel 16 in a direction substantially perpendicular to a flow direction.

Returning to FIG. 1, in operation, thermal bridge 14 is in thermal communication with main liquid conduit 12 and heat conducting plate 26A (not shown in FIG. 1) disposed in an upper portion of thermophoretic tunnel 16 to conduct heat from a particulate containing liquid in main liquid conduit 12 through thermal bridge 14 to heat conducting plate 26A said heat passing through the particulate containing liquid passing through flow channels, e.g., 24 in thermophoretic tunnel 16 thereby heating conducting plate 26B disposed in an lower portion of thermophoretic tunnel 16 to thereby creating a thermal gradient producing a thermophoretic force directed substantially perpendicular to a liquid flow direction 16C in thermophoretic tunnel 16. Heating plate 26B disposed in a lower portion thermophoretic tunnel 16 forming a bottom portion of flow channels e.g., 24 included in thermophoretic tunnel 16 is in thermal communication via an array of heat pipes e.g., 28A with heat sink 30 maintained at a constant lower temperature relative to the particulate containing liquid thereby conducting heat through thermophoretic tunnel 16 and maintaining a thermal gradient for exerting a thermophoretic force on particles included in the particulate containing liquid passing through a thermophoretic tunnel 16.

In operation, for example, turning to FIGS. 3A and 3B, upper portion 301 of thermophoretic tunnel 16 has a relatively higher temperature compared with a relatively lower temperature of lower portion 303 of thermophoretic tunnel 16. As a result, an exemplary particle e.g., 305 experiences a thermophoretic force vector 307 together with a flow force vector 309 to give a resultant force vector 311. Preferably the magnitude of the resultant force vector 311 is sufficient to displace a particle to a lower portion of the thermophoretic tunnel prior to the particle exiting the thermophoretic tunnel. FIG. 3B is a schematic representation of the operation of the thermophoretic tunnel 16 displacing entrained particles, e.g., 305A, to a lower portion of the thermophoretic tunnel 16, e.g., 305B, to exit through outlet 22C, while a relatively particulate free liquid exits through outlet 22B to return to the main liquid conduit 12. Returning to FIG. 1, outlet pipe 18C carries the separated entrained particles to a particle collector 32 for removing the entrained particles from the liquid.

In another embodiment, heat pipe array e.g., 34A thermally connects particle collector 32 with heat sink 30 in order to maintain a thermal gradient to improve the thermophoretic performance of particle collector 32. It will be appreciated that a separate heat sink may be optionally used to thermally communicate with particle collector 32. The particle collector 32 preferably has a means to capture and entrap particles driven by, for example, a thermophoretic force into such means. In an exemplary embodiment, referring to FIG. 4A, outlet pipe 18C from thermophoretic tunnel 16 forms inlet 18C which feeds particle collector feed 34 centrally disposed in particle collector 32 to carry the particulate containing liquid into a bottom portion of particle collector 32 where the particulate containing liquid begins to fill the particle collector 32 following flow direction arrows e.g., 32A and 32B. In an exemplary embodiment, disposed around particle collector feed 34 are particle depositors e.g. 36, forming for example, a vertical spaced apart stack of disk shaped plates having a centrally located opening through which particle collector feed 34 passes, each plate having concentric protrusions or fins (see FIG. 4B) extending from an upper particle depositing surface (see FIG. 4B) for capturing and entrapping particles driven toward the depositing surface.

For example, referring to FIG. 4B, is an expanded view of an exemplary embodiment of the particle collecting means including a portion of the particle depositors e.g., 36. The particle depositor e.g., 36 is formed of, for example, a thermally conductive disk shaped plate 36A having a depositing surface 36B, a peripheral portion being thermally connected to the thermally conductive particle collector walls, e.g. 38 in FIG. 4A. The particle collector walls, e.g. 38 are further thermally connected via an array of heat pipes e.g., 34A (see FIG. 1) to a heat sink, for example heat sink 30, for completing the thermal conduction pathway for forming a thermal gradient with a resulting thermophoretic force operating to displace entrained particles toward particle depositing surface 36B. Each disk shaped plate 36A is equipped with means for capturing and holding particles contacting depositing surface 36A. For example, a series of concentric protrusions or fins e.g., 36C, also preferably thermally conductive and chemically resistant (e.g., stainless steel), are formed to protrude upward from particle depositing surface 36B thereby capturing and entrapping particles e.g., 36D at the particle depositing surface 36B. Referring to FIG. 4C, a top view of the depositors e.g., 36 is shown with the concentrically formed fins, e.g., 36C for capturing and holding particles contacting depositing surface 36B including by operation of a thermophoretic force. For example, in an exemplary embodiment the fins 36C protrude above the surface 36B from about 0.5 mm to about 3 mm, are about 0.5 mm to about 3 mm in width, and are concentrically spaced from about 0.5 mm to about 3 mm.

In another embodiment, referring again to FIG. 4A, particle collector 32 includes a drain port 40 in the lower portion of particle collector 32 for capturing and removing particles from particle collector 32 thereby recycling the depositors e.g., 36 for filtering particles from the particulate containing liquid. In operation, after the particulate containing liquid passes through particle collector 32, a relatively, particulate free liquid is returned via outlet pipe 34 to main liquid conduit 12 preferably near the converging area in the diffuser 13 as shown in FIG. 1. The outlet pipe 34 preferably includes in a flow path disposed between particle collector 32 and main liquid conduit 12 a flow regulator 36 similar to flow regulator 20 to selectively control a flow rate.

In related exemplary embodiments, the main liquid conduit 12 is cylindrical with a diameter of from about 1 cm to about 4 cm in diameter. Further, the inlet pipe 18A and outlet pipe 18B, creating a bypass flow path through thermophoretic tunnel 16, are cylindrical with a diameter from about 0.25 to about 1 cm in diameter with a radius of curvature for example, extending from about 5 cm to about 20 cm in arc length such that laminar flow is maintained through the thermophoretic tunnel 16. In exemplary operation, the inlet pipe 18A is formed such that a volumetric flow from about 2.5 percent to about 10 percent, more preferably about 5 percent, is re-directed from main liquid conduit 12 through inlet pipe 18A and thermophoretic tunnel 16 such that laminar flow is maintained through thermophoretic tunnel 16. In addition, a flow regulator 20, in flow pathway of outlet pipe 18B is selectively controllable to alter a flow rate to maintain a laminar flow through thermophoretic tunnel 16. A volumetric flow entering the thermophoretic tunnel 16, for example, may range from about 250 CC/min to about 1000 cc/min, more preferably about 500 cc/min, depending on the Reynolds number of the system, the flow rate preferably remaining below the point for the onset of turbulence. In other exemplary embodiments the flow channels, e.g., 24 in thermophoretic tunnel 16 have dimensions of, for example, a width of about 0.25 to about 1 cm, a height of about 0.025 to about 1 cm and a length of about 20 cm to about 30 cm.

In yet other embodiments, a plurality of thermophoretic systems are connected in series to increase the efficiency of particle removal from the particulate containing liquid. Additionally, a thermophoretic system may include a plurality of particle collectors connected in series to increase the efficiency of particle removal in a single thermophoretic system. In operation, one or more thermophoretic systems are serially placed in a flow path of the particulate containing liquid.

According to the apparatus and method of the present invention, a thermophoretic system and method has been presented whereby a wide range of particle sizes present in a liquid may be effectively captured and removed from the liquid without creating an unacceptable pressure drop while providing for cost effective recycling of the particle filtering means.

The preferred embodiments, aspects, and features of the invention having been described, it will be apparent to those skilled in the art that numerous variations, modifications, and substitutions may be made without departing from the spirit of the invention as disclosed and further claimed below.

What is claimed is:

1. A method for thermophoretically removing particles from a particulate containing liquid comprising:

providing a heated turbulent flowing particulate containing liquid through a first conduit;

redirecting a portion of the particulate containing liquid through a second conduit to provide laminar flow having a flow direction substantially parallel to the first conduit;

forming a thermal gradient in said second conduit substantially perpendicular to the flow direction;

concentrating particles in the particulate containing liquid in a portion of the second conduit aided at least in part by thermophoretic forces; and separating the particulate containing liquid into at least a relatively concentrated particle containing portion and a relatively unconcentrated particle containing portion.

2. The method of claim 1, wherein the thermal gradient is formed by thermally conductively contacting said upper portion of the second conduit with the lower portion of said first conduit the thermal gradient having a decreasing temperature profile in a direction toward the lower portion of the second conduit.

3. The method of claim 1, wherein the step of separating the particulate containing liquid further comprises collecting the relatively concentrated particle containing portion in a lower portion of the second conduit such that the relatively unconcentrated particle containing portion is collected in an upper portion of the second conduit exiting through an upper exit portion of the second conduit to be returned to the first conduit the lower portion exiting through a lower exit portion of the second conduit.

4. The method of claim 1, wherein thermal conductance in a direction other than substantially perpendicular to the flow direction is minimized.

5. The method of claim 1, further comprising maintaining the temperature gradient by providing a heat sink at a relatively lower temperature than the first conduit and the second conduit said heat sink in thermally conductive communication with the second conduit.

6. The method of claim 3, further comprising the step of removing particles from the particulate containing liquid included in the lower portion exiting through the lower exit portion of the second conduit.

7. The method of claim 6, wherein the step of removing particles includes passing the particulate containing liquid over at least one depositing surface to form a flow pathway such that particles included in the particulate containing liquid are captured and entrapped upon impacting said at least one depositing surface.

8. The method of claim 7, wherein the at least one depositing surface is in thermally conductive communication with a heat sink maintained at a temperature relatively lower than the at least one depositing surface temperature.

9. The method of claim 7, wherein the at least one depositing surface includes a plurality of protrusions extending into the flow pathway to form a plurality of particle capturing spaces.

10. The method of claim 6, wherein the steps are performed in parallel according to a plurality of serially connected first and second conduits.

* * * * *